US012549015B2

(12) United States Patent
Shi et al.

(10) Patent No.: US 12,549,015 B2
(45) Date of Patent: Feb. 10, 2026

(54) SENSORLESS CURRENT SHARING FOR POWER CONVERTERS

(71) Applicant: Rivian IP Holdings, LLC, Plymouth, MI (US)

(72) Inventors: Yanjun Shi, Torrance, CA (US); Zahra Mohajerani, Los Angeles, CA (US); Mohammad Nanda Rahmana Marwali, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 652 days.

(21) Appl. No.: 18/090,855

(22) Filed: Dec. 29, 2022

(65) Prior Publication Data

US 2024/0222979 A1    Jul. 4, 2024

(51) Int. Cl.
*H02J 3/46*     (2006.01)
*H02M 1/00*    (2006.01)
*H02J 7/02*     (2016.01)

(52) U.S. Cl.
CPC ............. *H02J 3/46* (2013.01); *H02M 1/0009* (2021.05); *H02M 1/0025* (2021.05); *B60L 2210/10* (2013.01); *B60L 2210/30* (2013.01); *H02J 7/02* (2013.01); *H02J 2207/20* (2020.01)

(58) Field of Classification Search
CPC .. H02M 1/0009; H02M 1/0025; H02M 1/007; H02M 3/1584; H02M 3/285; H02J 3/46
See application file for complete search history.

(56) References Cited

U.S. PATENT DOCUMENTS

| 7,030,512 | B2 | 4/2006 | Krein |
| 8,068,355 | B1 | 11/2011 | Ikriannikov et al. |
| 8,284,576 | B2 | 10/2012 | Danesh-Pajooh-Nejad et al. |
| 10,153,710 | B1* | 12/2018 | Barbosa ................. H02M 7/23 |
| 2004/0076024 | A1* | 4/2004 | Liu ....................... H02M 3/156 363/41 |
| 2012/0007431 | A1* | 1/2012 | Jang ........................ H02J 4/00 307/82 |
| 2012/0153730 | A1* | 6/2012 | Barnett ................. H02M 3/285 307/82 |

* cited by examiner

*Primary Examiner* — Jue Zhang
*Assistant Examiner* — Lakaisha Jackson
(74) *Attorney, Agent, or Firm* — BAKERHOSTETLER

(57) ABSTRACT

Disclosed are embodiments for sensorless multi-stage power converters. The multi-stage power converters include a first stage that regulates a current of an input to the first stage and a second stage that regulates a voltage obtained from the first stage.

20 Claims, 7 Drawing Sheets

SENSORLESS CURRENT SHARING FOR POWER CONVERTERS

INTRODUCTION

Power converters are used in a plurality of different applications to convert electrical energy from a source for use in a particular application. For example, vehicle charging stations may obtain power from a grid to power electric vehicles not otherwise powered by traditional fuel. Charging stations may deliver electric power to an electric vehicle using one or more power converters.

SUMMARY

Various aspects of the technology described herein are generally directed to systems, methods, and computer storage media for, among other things, providing a power converter that is capable of setting equal or arbitrary current for a load. For example, multi-stage alternating current (AC) to direct current (DC) power converters rely on sensors to monitor and regulate various aspects of the load (e.g., current, voltage, etc.). Specifically, these systems require sensors to monitor input voltage and current to the AC/DC stage and other sensors to monitor input and output voltage and current to the DC/DC stage. Furthermore, these types of multi-stage power converters dominate the vehicle power systems and, in order to handle the load required, are set-up in parallel (referred to as "slices") thereby increasing the number of sensors required.

In various embodiments, the AC/DC stage regulates the output charging current to the battery (e.g., the current of the final output of the power converter) by applying gain values (e.g., power ratio) to the input (e.g., electrical power) to the multi-stage power converter and the DC/DC stage regulates the voltage across the DC bus (e.g., the connection between the AC side and the DC side). This is a reversal of such systems where the AC/DC side controls the voltage across the bus and the DC/DC side controls the output charging current to the battery. In addition, the DC/DC stage, in various embodiments, controls the output voltage by applying gain values (e.g., voltage ratio). Although the term gain value is used, the power converter described in the present disclosure can be used to increase or decrease the voltage, current, etc., provided to the load. Furthermore, as described below, this configuration does not require sensors to monitor the output of DC/DC slices.

To accomplish this, in an embodiment, the AC/DC stage includes an outer control loop and an inner control loop. In addition, the outer control loop regulates the output charging current by applying a first gain value that enforces the split between the multi-stage power converters, while the inner control loop regulates the current for the AC/DC stage. Turning to the DC/DC stage, the voltage across the DC bus is regulated by a single control loop that applies a second gain value to the output of the AC/DC stage. The first and second gain values are independent and can be determined by software. For example, various factors such as age, temperature, efficiency, or performance can be used to determine the gain values and regulate the amount of energy provided by each multi-stage power converter to the load. In this manner, aspects of the technology described herein facilitate the conversion of electrical power to a load without the need for sensors to improve the efficiency and lifetime of the power converters.

Furthermore, various controllers can be used in the control loops (e.g., the outer and inner control loops of the AC/DC stage) to regulate various aspects of the electrical power provided to charge the battery. For example, as described in greater detail below in connection with FIG. 2, a proportional integration (PI) controller uses a current reference for a battery to regulate the input to the AC/DC stage of the power converter. Similarly, a PI controller can be used within the control loop of the DC/DC side of the power converter to regulate the output (e.g., DC voltage) to charge the battery.

Advantageously, the power converters described in the present disclosure enable the control of the output of electrical power across a plurality of stages without the need for current sensors at the output of each DC/DC slice. In addition, as opposed to other two-stage power converters, the AC/DC stage (e.g., the first stage) controls the final output and the DC/DC stage (e.g., the second stage) controls the input to the DC/DC stage. Furthermore, power converters described in the present disclosure achieve the distribution and conversion of power without the use of DC/DC output current sensors and thereby reduce the cost and complexity of the power converters. In various embodiments, the ability to arbitrarily set and or change the amount of electrical power distributed by the power converter allows for increased efficiency and durability of the power converters. For example, over time, performance of power converters may decrease and the gain value (e.g., power ratio and/or voltage ratio) is modified to distribute a larger portion of the electrical power to other power converters (e.g., arranged in parallel or serial) thereby ensuring efficiency and performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
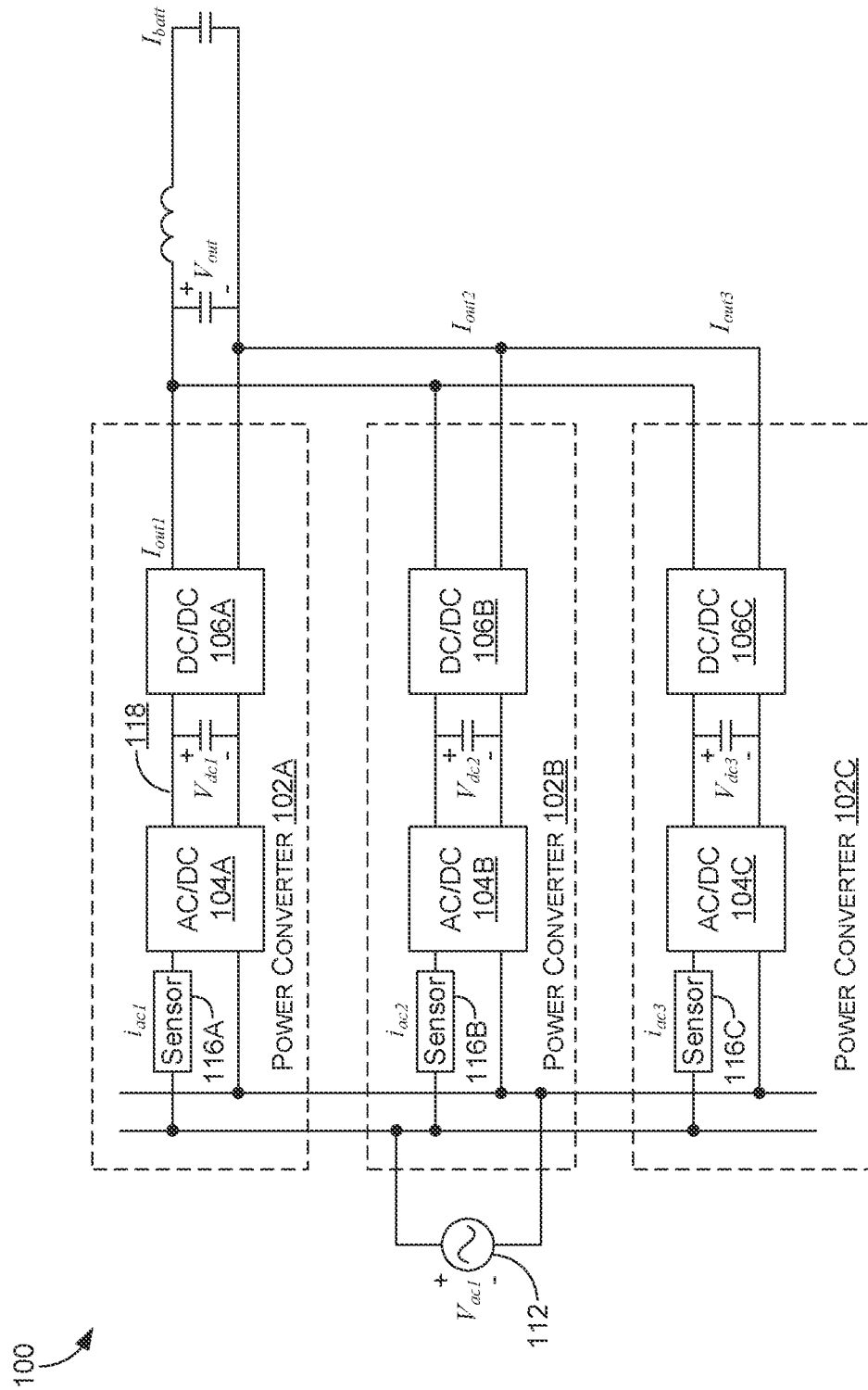
FIG. 1 is a block diagram of an exemplary schematic of a plurality of multi-stage power converters arranged in parallel, in accordance with aspects of the technology described herein.

Vehicle management systems support a network of resources and services to ensure convenient vehicle operations. For example, a charging system (e.g., a charging station, DC fast charger, in-vehicle charging system) of a vehicle management system can operate as part of the electric vehicle (EV) management system to provide powering, charging, or other suitable EV services. In particular, the charging station system may deliver electric power to an electric vehicle for transportation tasks. For example, the charging system of a charging station includes a set of power converters (e.g., arranged in parallel) that obtain electrical power from a source (e.g., AC power grid) and, when a driver connects their EV to the charging system, converts the electrical power to supply energy to the battery in the appropriate form (e.g., voltage, current, etc.).

In some charging systems, sensors are used to monitor the output of the power converters at multiple stages. In addition, these charging systems do not include control logic (e.g., an application or other executable code) to support equal and/or arbitrary distribution of power converters within the charging systems. In particular, charging systems, such as those at charging stations, include a plurality of power converters to supply electrical power to the batteries of an EV. For example, the plurality of power converters obtain AC power from a source and convert it to DC power to charge the battery. Furthermore, the charging systems include a plurality of sensors to monitor electrical power at various stages of power conversion to enable the charging system to control and/or convert the electrical power to charge the battery.

Embodiments described herein are generally directed to systems, methods, and computer storage media for, among other things, providing a charging station system that distributes equal and/or arbitrary electrical power between the plurality of power converters in various arrangements without the use of sensors. For example, a set of multi-stage power converters obtains AC power from a grid and converts the electrical power to DC power to charge a set of batteries in the EV. In various embodiments, the number of sensors required in the multi-stage power converter is reduced by at least causing the AC/DC stage to regulate the final output of the power converter while the DC/DC stage regulates the intermediary bus, in contrast to other systems that cause the AC/DC stage to regulate the intermediary bus and the DC/DC stage to regulate the final output of the power converter.

In an embodiment, a plurality of multi-stage power converters are arranged in parallel or in serial to achieve electrical power sharing (e.g., between the multi-stage power converters) and/or modifying an amount of electrical power provided to a load (e.g., increasing the voltage or current supplied to a battery). In one example, the multi-stage power converters include two-stage power converters that include an AC/DC first stage and a DC/DC second stage. In various embodiments, the AC/DC stage is responsible (e.g., controls) the final output (e.g., voltage and current) of the multi-stage power converter to provide a battery or other load. For example, the AC/DC stage includes a controller (e.g., PI controller) that regulates the input to the AC/DC stage of the multi-stage power converter to match a particular reference (e.g., battery current reference). In this manner, the output of the multi-stage power converter is obtained by controlling the input to the AC/DC stage. In an embodiment, the second stage (e.g., DC/DC stage) controls an intermediary bus (e.g., DC link) between the AC/DC stage and the DC/DC stage. Similar to the example described above, in one example, the DC/DC stage includes a PI controller that regulates the voltage of the electrical power transmitted across the intermediary bus.

In various embodiments, equal or arbitrary ratios and/or multipliers can be applied to the electrical power (e.g., current, voltage, etc.) provided by the multi-stage power converters. For example, an application or other executable code determines a multiplier, a gain value, and/or ratio to apply to the input to one or more stages of the multi-stage power converter. In one embodiment, a first ratio (e.g., a power ratio) is applied to the electrical power provided to the AC/DC stage (e.g., obtained from the power grid) and a second ratio (e.g., a voltage ratio) is applied to the electrical power coming across the intermediary bus into the DC/DC stage. For example, a PI controller arranged in a feedback loop regulates the current obtained from a source (e.g., power grid), the power ratio is then applied as a gain value to the electrical power obtained from the PI controller to enforce the distribution of power between multi-stage power converters arranged in parallel. Similarly, in various embodiments, a voltage ratio is applied as a gain value at the DC/DC stage of the multi-stage power converters to the electrical power obtained.

Aspects of the technical solution can be described by way of examples and with reference to FIG. 1. FIG. 1 illustrates a plurality of multi-stage power converters arranged in parallel 100 that includes three multi-stage power converters 102A, 102B, and 102C (referred to collectively or individually as multi-stage power converter 102 or multi-stage power converters 102). In one embodiment, the multi-stage power converters 102 provide electrical power to the electric vehicle system 600 of FIG. 6. In the example illustrated in FIG. 1, the multi-stage power converters 102 obtain electrical power from an input 112 and convert the electrical power to be used by a battery 122. Furthermore, in various embodiments, the multi-stage power converters 102 include an AC/DC stage 104A, 104B, and 104C (referred to collectively or individually as AC/DC stage 104 or AC/DC stages 104) and a DC/DC stage 106A, 106B, and 106C (referred to collectively or individually as DC/DC stage 106 or DC/DC stages 106).

In various embodiments, the input 112 includes an energy sink receiving power from a solar panel, wind sources, nuclear sources, hydro sources, gas sources, and the like. For example, the input 112 is connected to an AC power grid via a connector and/or coupler to draw electrical power from the power grid. As described herein, the multi-stage power converters 102 may be capable of converting incoming voltage (e.g., from the input 112) to a voltage that can be used to charge the battery 122 (e.g., charge batteries of the electric vehicle). In one embodiment, the multi-stage power converters 102 can include an inverter, an on-board-charger, and/or a converter as needed to convert electrical power from the input 112 to be used by the battery 122. The multi-stage power converters 102 may receive voltage from a variety of additional sources beyond the input 112.

In an embodiment, the multi-stage power converters 102 are included in a charging station system that is capable of charging an electric vehicle. For example, the charging station system (also referred to herein as "EV charger", "electric vehicle supply equipment (EVSE)", or "charging station") may include the plurality of multi-stage power converters 102 that supplies electric power for charging electric vehicles. In other embodiments, the multi-stage power converters 102 are included in the electric vehicle to charge the batteries of the electric vehicle.

In various embodiments, to facilitate providing electrical power from the input 112 to the battery 122, the multi-stage power converters 102 include a set of sensors 116A-116D. In an embodiment, at least a portion of the sensors 116A-116D are included in a control loop and/or feedback loop to regulate the electrical power (e.g., current, voltage, etc.). For example, as described in greater detail below in connection with FIG. 2, the AC/DC stage 104 includes an outer control loop that includes a PI controller and sensor to regulate the output charging current "Vbatt" as illustrated in FIG. 1. In various embodiments, the sensors 116A-116D can measure voltage or current at various stages in the multi-stage power converters 102. Other sensors that are capable of detecting attributes of the electrical power distributed by the multi-stage power converters 102 can be used in accordance with the present embodiments.

As illustrated in FIG. 1, the multi-stage power converters 102 may include a modular design and be arranged in parallel to share the electrical power provided to the battery 122. For example, by equally stressing the multi-stage power converters 102, efficiency and lifetime may be improved. In various embodiments, a power ratio, applied at the AC/DC stage 104, ensures that each multi-stage power converter 102 draws the same amount of current from the input 112 and distributes the same amount of current across an intermediary bus 118 to the DC/DC stage 106B. For example, the power ratio includes a magnitude (e.g., gain value) multiplied by a sin wave (e.g., generated by a phase locked loop controller) to get the input current (e.g., input to intermediary bus 118) thereby enforcing power sharing at the output 122.

In various embodiments, the input 112 includes an AC utility grid, power grid, or any other source of electrical power. Furthermore, the output, in an embodiment, includes a battery, electrical motor, or any other draw of electrical power including a voltage source (e.g., battery). In various embodiments, the output includes a load (e.g., an electrical motor or other draw of electrical power) in parallel with the battery 122 which acts as a voltage source for the multi-stage power converters 102. In one example, the electric vehicle may be charged by applying a charging voltage to the high-voltage battery, electrical power is obtained from the input 112 and converter, by the multi-stage power converters 102, to the charging voltage based on the input requirements (e.g., current, voltage, etc.) of the high-voltage battery of the electric vehicle. In an embodiment, the high-voltage battery includes a deep-cycle battery. Furthermore, in some examples, the electric vehicle includes at least one multi-stage power converter 102 to convert the high-voltage of the high-voltage battery to a low-voltage battery. In one embodiment, the low-voltage battery may include a 12-volt battery.

In various embodiments, to facilitate conversion of electrical power from the input 112, as well as between the high-voltage battery and the low-voltage battery, the multi-stage power converter 102 may include circuitry for stepping voltage up or down and/or converting voltage between AC and DC. As illustrated in FIG. 1, the multi-stage power converter 102 includes an AC/DC converter (e.g., AC/DC stage 104) that converts AC current from the input 112 (e.g., AC power grid) to high-voltage DC current. In one embodiment, the multi-stage power converter 102 includes a DC/DC converter (e.g., DC/DC stage 106) that converts high-voltage DC current to low voltage (e.g., 12-V) DC current. It should be understood that in some embodiments, the multi-stage power converter 102 may include additional or alternative components, such as additional stages, printed circuit boards, housing, thermal protection, and so forth.

Although the electric vehicle is discussed in the context of obtaining electrical power from the multi-stage power converter 102, it should be understood that the embodiments described herein are not limited to operation with electric vehicles (e.g., charging). Indeed, the embodiments described herein may be employed for other vehicles, such as hybrid vehicles, autonomous vehicles, semi-autonomous vehicles, and other vehicles, such as trains, planes, and the like. In addition, in embodiments described herein may be used to supply power to any load 122.

In some embodiments, the multi-stage power converter 102 includes or may be otherwise communicatively coupled to any suitable integrated circuit (IC), such as an application-specific IC (ASIC) controller, a digital signal processor (DSP), and the like to determine and/or set the power ratio and/or voltage ratio. In other embodiments, the multi-stage power converter 102 includes or may be otherwise communicatively coupled to a processor and memory including executable instructions (e.g., an application) that, when executed by the processor, cause the power ratio and/or voltage ratio to be determined and/or set for a particular multi-stage power converter 102 and/or the plurality of multi-stage power converters 102. In this manner, the distribution of electrical power between the plurality of multi-stage power converters 102 can be initially determined and/or modified. For example, a new multi-stage power converter can be added to the plurality of multi-stage power converters 102 or replace an existing multi-stage power converter and, as a result, the distribution of electrical power between the plurality of multi-stage power converters 102 can be modified by at least modifying the power ratio and/or the voltage ratio using the application. In another example, the application monitors the amount of electrical power distributed to the battery 122 by each multi-stage power converter 102 (e.g., using one or more sensors 116A-116D) and adjusts the power ratio and/or the voltage ratio to modify the distribution of electrical power between the plurality of multi-stage power converters 102 to increase efficiency and/or the lifetime of the multi-stage power converters 102.

Figure 2:
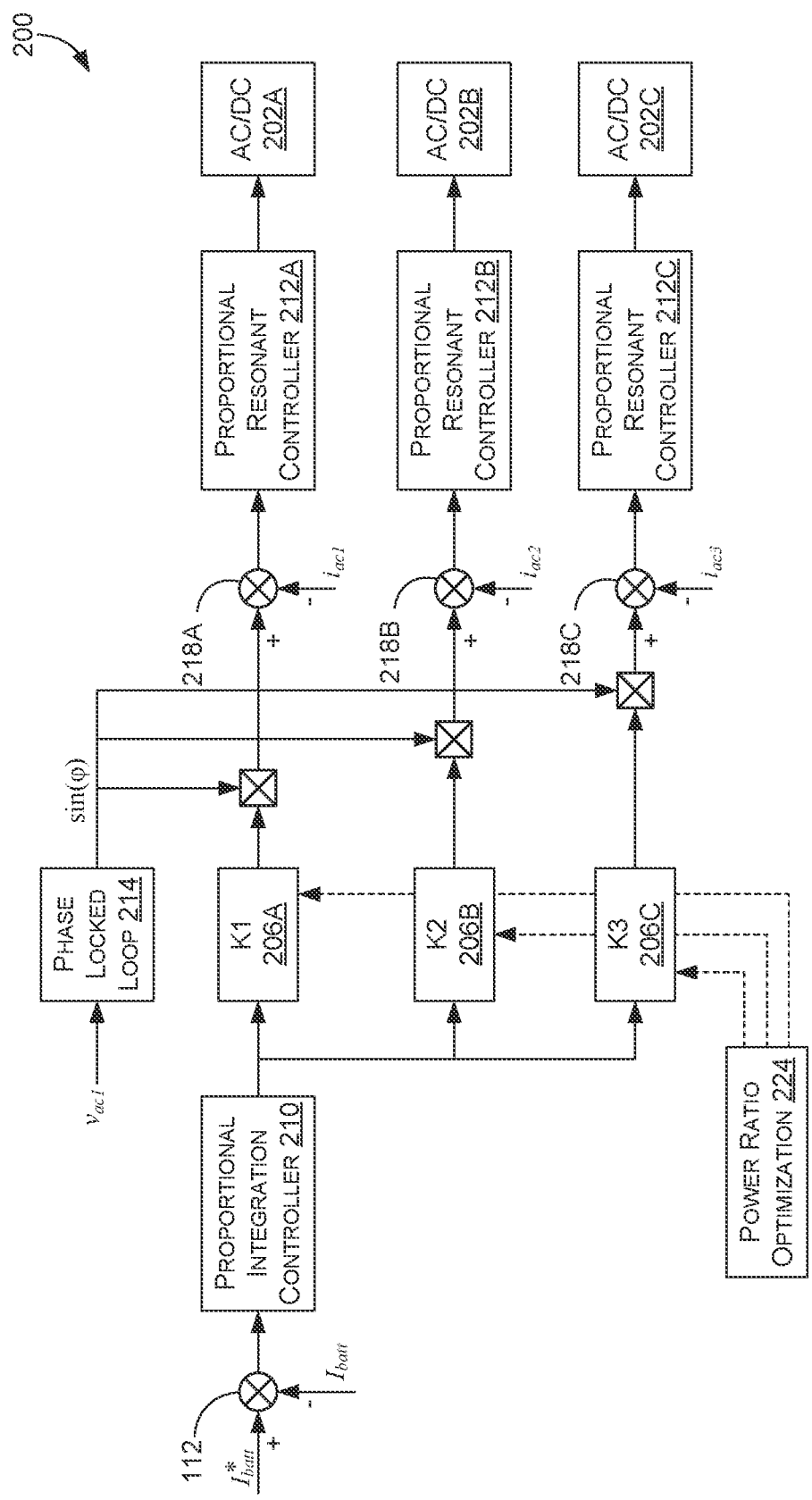
FIG. 2 is a block diagram of an exemplary schematic of a first stage of a multi-stage power converter, in accordance with aspects of the technology described herein.

Turning to FIG. 2, FIG. 2 illustrates an environment 200 including a first stage of a multi-stage power converter, in accordance with aspects of the technology described herein. In some embodiments, the first stage of the multi-stage power converter converts AC power obtained from an input 112 to DC power to provide to a load. In various embodiments, the first stage of the multi-stage power converter includes an outer feedback loop including a proportional integration (PI) controller 210 that regulates the current to the load (e.g., a battery) and an inner feedback loop including a set of proportional resonant (PR) controllers 212A-212C that regulates the current within the first stage of the multi-stage power converter. In addition, in an embodiment, the first stage of the multi-stage power converter includes a phase locked loop (PLL) 214 that ensures the current drawn from the input 112 is in phase and sinusoidal with the load. For example, the PLL 214 ensures that the input frequency and the output frequency are the same.

Furthermore, in an embodiment, the first stage of the multi-stage power converter includes a power ratio optimization 224 application or other executable code that determines a set of gain values K1 206A, K2 206B, and K3 206C (also referred to collectively or individually as gain values 206A-206C) which, when applied to the electrical power obtained from the PI controller 210, causes or otherwise enforces an equal or arbitrary distribution of electrical power between a set of multi-stage power converters 202A-202C. For example, the gain values 206A-206C can include a multiplier and/or ratio that when applied to the electrical power from the input 112 causes a step up or step down in current, voltage, or other property of the electrical power. Furthermore, in some embodiments, the gain values 206A-206C may be the same value or different values. For example, by setting the gain values 206A-206C to different values, particular distributions of electrical power between the set of multi-stage power converters 202A-202C can be achieved. In a particular example, the gain value 206A (e.g., K1) can be set to two and the gain values 206B and 206C (e.g., K2 and K3) can be set to one, causing the multi-stage power converter 202A to distribute twice as much electrical power to the load than the multi-stage power converters 202B and 202C.

In various embodiments, the power ratio optimization 224 application includes executable instructions stored in memory that, when executed by a processor, perform various operations described in the present disclosure. In addition, in an embodiment, the power ratio optimization 224 application may communicate (e.g., over a network) with one or more other computer devices to perform the various operations described in the present disclosure. For example, the power ratio optimization 224 application communicates with monitoring devices that monitor the electrical power distributed by each multi-stage power converter 202A-206C to enable the power ratio optimization 224 application to modify the gain values 206A-206C.

In an embodiment, the PI controller 210 applies an accurate and responsive correction to a control function by at least measuring an error value as the difference between a desired set point (e.g., current reference for the battery) and a measured process variable (e.g., a sensor measurement) and applies a correction based on proportional or integral terms. For example, the PI controller 210 obtains as an input the current reference for the battery of an electric vehicle and modifies the input 112 to match the current reference for the battery. In an embodiment, the PI controller 210 includes a sensor to measure the error value. In other embodiments, the PI controller 210 obtains the error value from a device communicatively coupled to the PI controller 210.

In various embodiments, the PLL 214 includes a control system or other controller that generates an output signal whose phase is related to the phase of an input signal. For example, the PLL 214 generates an output that is in phase with the input and sinusoidal. In one embodiment, the PLL 214 includes an electronic circuit consisting of a variable frequency oscillator and a phase detector in a feedback loop. For example, the frequency and phase of the variable frequency oscillator is controlled proportionally by an applied voltage (e.g., a voltage-controlled oscillator (VCO)). In various embodiments, the oscillator (e.g., VCO) generates a periodic signal of a specific frequency, and the phase detector compares the phase of that signal with the phase of the input periodic signal, to adjust the oscillator to keep the phases matched. For example, by maintaining the input 112 and the output phase of the electrical power in lockstep causes the input 112 and output frequencies to be in phase as well. Furthermore, in an embodiment, the output of the PLL 214 is multiplied by the gain values 206A-206C.

In various embodiments, the PR controllers 212A-212C include closed-loop control functions with a sinusoidal behavior. Similar to the PI controller 210, in one example, the PR controllers 212A-212C measure an error value as the difference between a desired set point (e.g., current reference for the AC/DC stage of the multi-stage power converters 202A-202C) and a measured process variable (e.g., a sensor measurement from a set of sensors 116A-116D) and applies a correction based on a proportional and a resonant term, which can be tuned independently. In an embodiment, PR controllers 212A-212C have a high gain around the resonant frequency and are capable of eliminating the steady-state error when tracking or rejecting a sinusoidal signal (e.g., from the PLL 214). As described above, the first stage of the multi-stage power converter as illustrated in FIG. 2 is responsible for managing the final output of electrical power to the load (e.g., voltage and current output by the multi-stage power converter).

Figure 3:
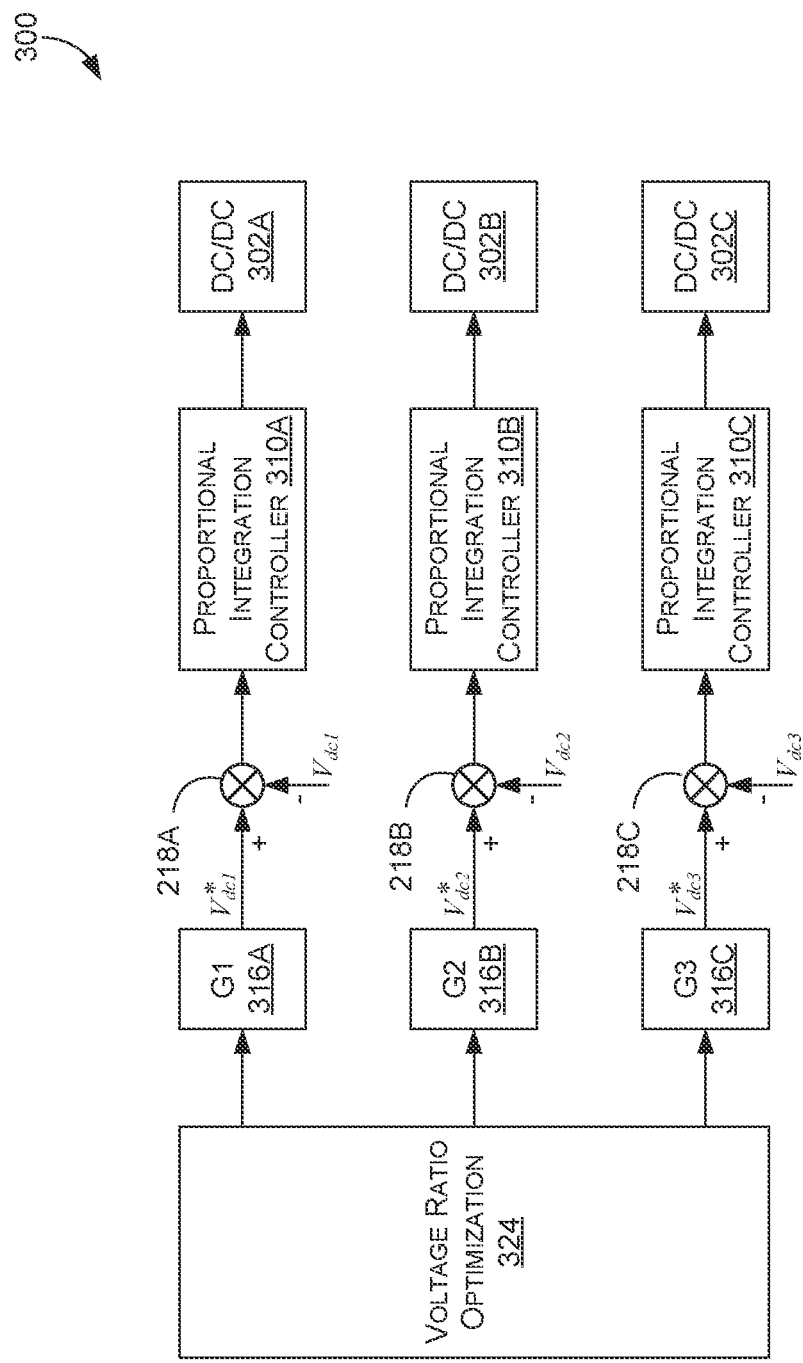
FIG. 3 is a block diagram of an exemplary schematic of a second stage of a multi-stage power converter, in accordance with aspects of the technology described herein.

FIG. 3 illustrates an environment 300 including a second stage of a multi-stage power converter, in accordance with aspects of the technology described herein. In some embodiments, the second stage of the multi-stage power converter includes a voltage ratio optimization 324 application the determines a set of gain values 316A-316C to apply to an input obtained over an intermediary bus from a first stage of the multi-stage power converter (e.g., the first stage described above in connection with FIG. 2). For example, the set of gain values 316A-316C includes a multiplier applied to the voltage of the electrical power transmitted over the intermediary bus. In various embodiments, the set of gain values 316A-316C is different than the set of gain values 206A-206C as described above in connection with FIG. 2.

In various embodiments, the voltage ratio optimization 324 application includes executable instructions stored in memory that, when executed by a processor, perform various operations described in the present disclosure. In one example, the power ratio optimization 224 described above in connection with FIG. 2 and the voltage ratio optimization 324 are components and/or functions of a single application. In addition, in an embodiment, the voltage ratio optimization 324 application may communicate (e.g., over a network) with one or more other computer devices to perform the various operations described in the present disclosure. For example, the voltage ratio optimization 324 application communicates with monitoring devices that monitor the electrical power distributed by each multi-stage power converter 302A-302C to enable the voltage ratio optimization 324 application to modify the gain values 316A-316C.

In an embodiment, the PI controllers 310A-310C apply an accurate and responsive correction to a control function by at least measuring an error value as the difference between a desired set point (e.g., voltage reference for the second stage of the multi-stage power converter) and a measured process variable (e.g., a sensor measurement from a sensor of the set of sensors 218A-218C) and applies a correction based on proportional or integral terms. For example, the PI controllers 310A-310C obtain as an input the voltage reference for the battery and modify the input to match the voltage reference for the battery. In another example, the PI controllers 310A-310C obtain as an input a voltage reference for the second stage of the multi-stage power converter and modify the input to match the voltage reference. In an embodiment, the PI controllers 310A-310C include the set of sensors 218A-218C to measure the error value. In other embodiments, the set of sensors 218A-218C is not integrated with the PI controllers 310A-310C. As described above, the second stage of the multi-stage power converter as illustrated in FIG. 3 is responsible for managing the electrical power provided across the intermediary bus.

Figure 4:
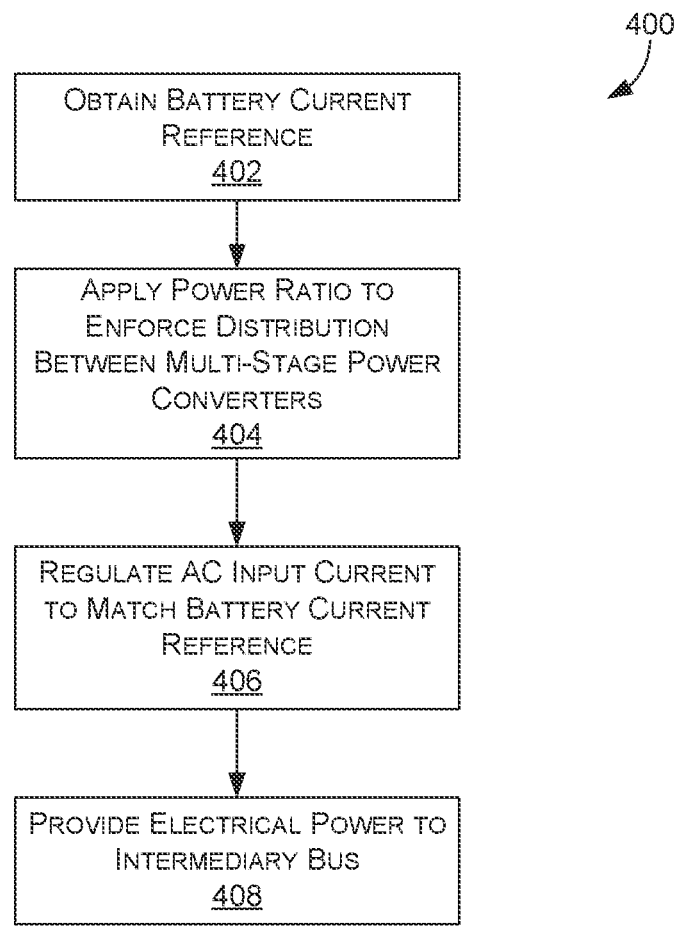
FIG. 4 is a flow diagram of an exemplary method for setting the output current at a first stage of a multi-stage power converter, in accordance with aspects of the technology described herein.

FIG. 4 is a flow diagram of an exemplary process 400 for regulating, by a first stage of a multi-stage power converter, various properties (e.g., current, voltage, phase, frequency, etc.) of electrical power provided by the multi-stage power converter to a load, in accordance with aspects of the technology described herein. At block 402, the system executing the process 400 obtains a battery current reference. For example, one or more components (e.g., components of a feedback loop) obtain a current reference for a battery of an electric vehicle acting as a load to the multi-stage power converter.

At block 404, the system executing the process 400 applies a power ratio value to enforce distribution of electrical power across a plurality of multi-stage power converters. For example, a gain value is applied to the electrical power obtained from an input (e.g., power grid). In various embodiments, the gain value includes a ratio of a split of the electrical power provided to the load by the plurality of multi-stage power converters.

At block 406, the system executing the process 400 regulates the AC input current to match the battery current reference and/or load reference. As described above in connection with FIG. 2, a controller regulates the current by measuring the current (e.g., using a sensor) and corrects the measured value using a proportional, integral, resonant, or other term. For example, a PI controller included in a feedback loop modifies the current obtained from an input to match the current reference. Although, the process 400 is described in regards to current, the process 400 can be used to modify various other properties of the electrical power provided by the multi-stage power converter such as voltage, phase, frequency, etc.

At block 408, the system executing the process 400 provides the electrical power to an intermediary bus. For example, in a two-stage power converter, a DC bus (e.g., an intermediary bus) provides electrical power from an AC/DC stage to a DC/DC stage.

Figure 5:
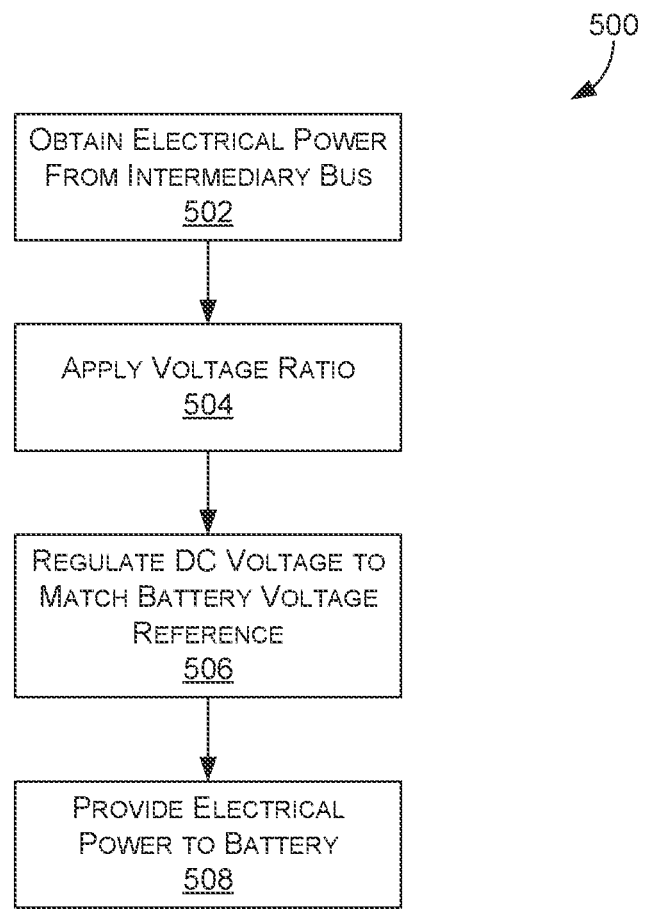
FIG. 5 is a flow diagram of an exemplary method for setting the voltage of an input from an intermediary bus at a second stage of a multi-stage power converter, in accordance with aspects of the technology described herein.

FIG. 5 is a flow diagram of an exemplary process 500 for regulating, by a second stage of a multi-stage power converter, various properties (e.g., current, voltage, phase, frequency, etc.) of electrical power obtained over an intermediary bus of the multi-stage power converter, in accordance with aspects of the technology described herein. At block 502, the system executing the process 500 obtains electrical power from an intermediary bus. For example, as described above, an AC/DC stage of a two-stage power converter provides electrical power to a DC/DC stage of the two-stage power converter over an intermediary bus (e.g., DC link).

At block 504, the system executing the process 500 applies a voltage ratio to the electrical power obtained from the intermediary bus. For example, the voltage ratio includes a gain value that regulates the voltage each multi-stage power converter of a plurality of multi-stage power converters draws across the intermediary bus and/or provides to a load. As described above, the gain value of the voltage ratio may be the same or a different value as the gain value corresponding to the power ratio.

In block 506, the system executing the process 500 regulates the DC voltage to match the battery voltage reference and/or load reference. As described above in connection with FIG. 3, a controller regulates the voltage by measuring the voltage (e.g., using a sensor) and corrects the measured value using a proportional, integral, resonant, or other term. For example, a PI controller included in a feedback loop modifies the voltage obtained from the intermediary bus to match the voltage reference. Although the process 500 is described in regards to voltage, the process 500 can be used to modify various other properties of the electrical power provided by the multi-stage power converter such as current, phase, frequency, etc.

At block 508, the system executing the process 500 provides the electrical power to the load. For example, the plurality of multi-stage power converters provides the electrical power to a battery of an electric vehicle.

Example Electric Vehicle System

Figure 6:
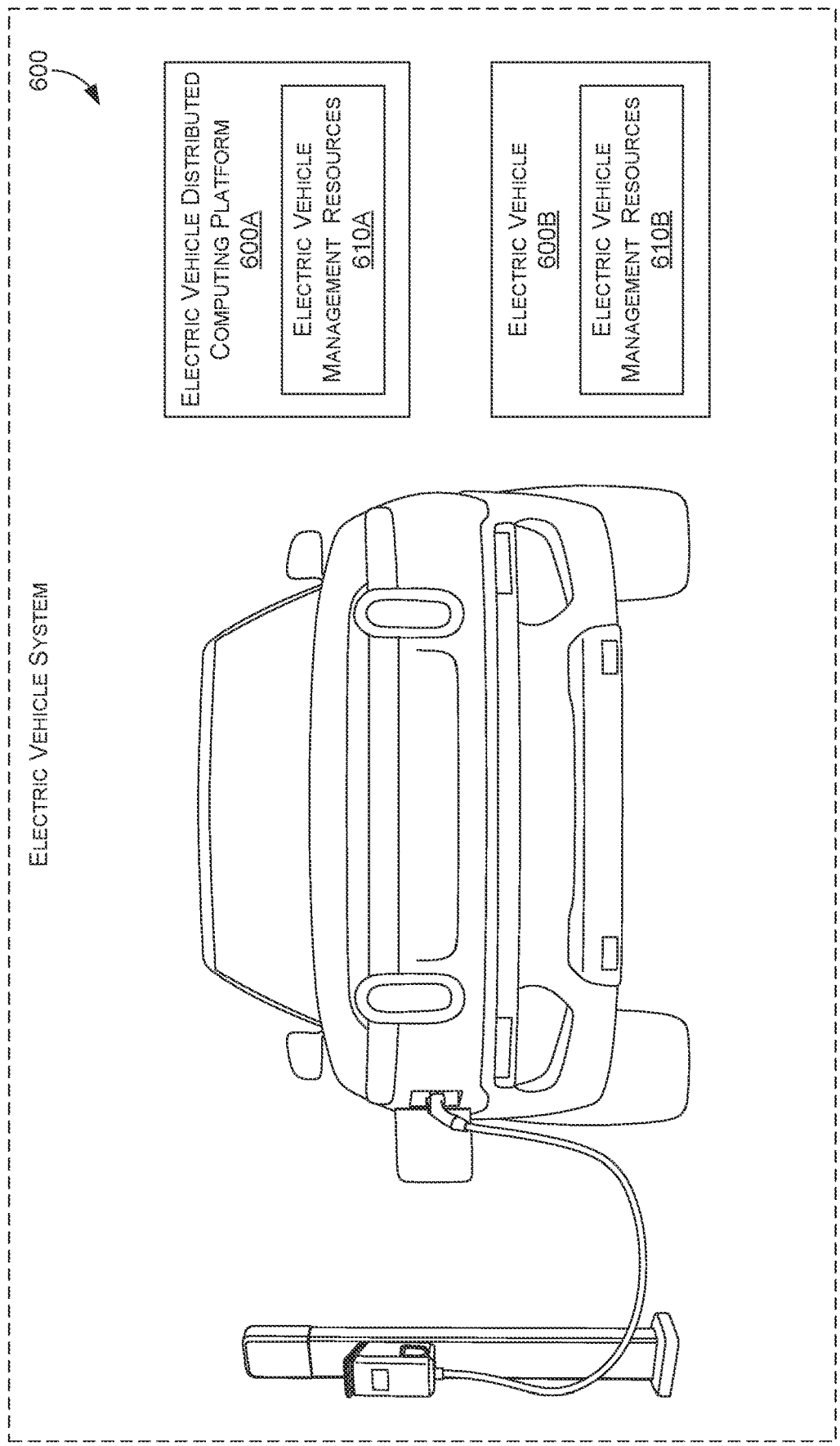
FIG. 6 is a schematic diagram of an example electric vehicle system, in accordance with aspects of the technology described herein.

With reference to FIG. 6, FIG. 6 illustrates an example electric vehicle system 600 in which implementations of the present disclosure may be employed. In particular, FIG. 6 shows a high level architecture of an example electric vehicle distributed computing platform 600A and electric vehicle 600B having electric vehicle management resources 610A and electric vehicle management resources 610B, respectively, that support the functionality described herein. The electric vehicle system 600 can host a technical solution environment, or a portion thereof.

The electric vehicle distributed computing platform 600A includes electric vehicle management resources 610A that provide and support electric vehicle distributed computing systems and operations. Electric vehicle distributed computing platform 600A can run cloud services across different data centers and geographic regions. Typically the electric vehicle distributed computing platform 600A acts to store data or run service applications in a distributed manner. For example, a service application can be supported a computing environment (e.g., host, node, and virtual machine) and resources (e.g., hardware resources and software resources) that are configured the service application; and a client device may be linked to a service application and configured to issue commands to the service application. Communications in the electric vehicle distributed computing platform 600A are performed through a virtual Internet Protocol (IP) and over a network (not shown), which may include, without limitation, one or more local area networks (LANs) and/or wide area networks (WANs).

The electric vehicle 600B includes electric vehicle management resources 610B that provide and support electric vehicle systems and operations. Electric vehicle 600B can refer to a vehicle that uses electric power. The electric vehicle 600B can be built on a configuration for an automotive chassis used for automotive platforms of battery electric vehicles. The configuration can include a base structure that houses the batteries, electric motors, and other electronic components of the electric vehicle. By way of example, the electric vehicle can include a steering system, brake sensor system, and controller systems.

Controllers can include one or more systems on chips (SoCs) that may provide signals to one or more components and systems of the vehicle. For example, controllers can support a steering system, braking system, one or more onboard computing devices, artificial intelligence functionality (e.g., computer vision), infotainment functionality, global navigation satellite systems and sensors (e.g., Global Positioning System sensors, RADAR sensors, LIDAR sensors) and inertial measurement unit (IMU) sensors (e.g., accelerometers, gyroscopes). Controllers may receive inputs (e.g., represented by input data) from and provide outputs (e.g., represented by output data, display data, etc.) via a human-machine interface (HMI) display @134 and other components of the electric vehicle.

The electric vehicle further includes a network interface which may use one or more wireless antenna(s) and/or modem(s) to communicate over one or more networks. For example, the network interface may be capable of communication over LTE, WCDMA, UMTS, GSM, CDMA2000, etc. The wireless antenna(s) @126 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown. The various blocks are shown with lines for the sake of conceptual clarity, and other arrangements of the described components and/or component functionality are also contemplated. FIG. 6 is merely meant to illustrative of an example electric vehicle and electric vehicle system that can be used in connection with one or more embodiments of the present disclosure.

Example Computing Environment

Figure 7:
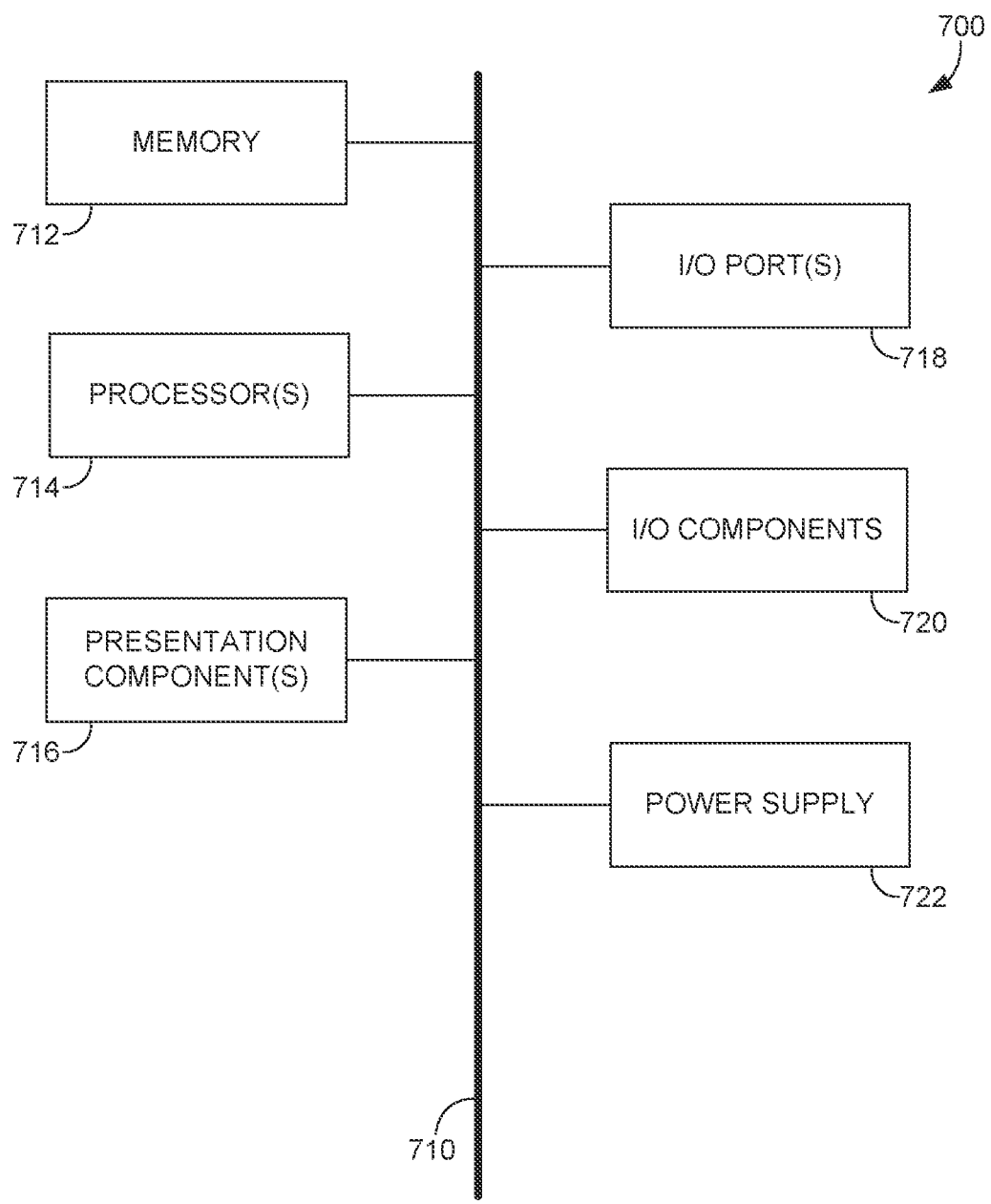
FIG. 7 is a block diagram of an exemplary computing environment suitable for use in implementing aspects of the technology described herein.

Having briefly described an overview of embodiments of the present disclosure, an example operating environment in which embodiments of the present disclosure may be implemented is described below in order to provide a general context for various aspects of the present disclosure. Referring initially to FIG. 7 in particular, an example operating environment for implementing embodiments of the present disclosure is shown and designated generally as computing device 700. Computing device 700 is but one example of a suitable computing environment and is not intended to suggest any limitation as to the scope of use or functionality of the disclosure. Neither should computing device 700 be interpreted as having any dependency or requirement relating to any one or combination of components illustrated.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are inherent to the structure.

It will be understood that certain features and sub-combinations are of utility and may be employed without reference to other features or sub-combinations. This is contemplated by and is within the scope of the claims.

What is claimed is:

1. A multi-stage power converter, comprising:
   a first stage including a first controller with an outer control loop and an inner control loop, wherein the outer control loop regulates a load by at least applying a first gain value to an input and the inner control loop regulates a current of the input to the first stage; and
   a second stage including a control loop that regulates a voltage between the first stage and the second stage by at least applying a second gain value to an output obtained from the first stage.

2. The multi-stage power converter of claim 1, wherein a second multi-stage power converter is arranged in parallel with the multi-stage power converter; and
   wherein the first gain value causes a portion of the load to be distributed to the multi-stage power converter.

3. The multi-stage power converter of claim 1, wherein the first gain value and the second gain value are equal.

4. The multi-stage power converter of claim 1, wherein the first gain value is determined based at least in part on an amount of energy provided by the multi-stage power converter.

5. The multi-stage power converter of claim 1, wherein the first stage further comprises an AC/DC power converter.

6. The multi-stage power converter of claim 1, wherein the second stage further comprises a DC/DC power converter.

7. The multi-stage power converter of claim 1, wherein the input is obtained from a power grid.

8. The multi-stage power converter of claim 1, wherein the multi-stage power converter is included in an electric vehicle.

9. The multi-stage power converter of claim 1, wherein the second stage provides an output voltage to a battery.

10. A method comprising:
    obtaining information associated with a multi-stage power converter; and
    modifying a first gain value or a second gain value associated with the multi-stage power converter, the multi-stage power converter comprising:
      a first stage that regulates a load provided by the multi-stage power converter by at least applying the first gain value to an input; and
      a second stage that regulates a voltage between the first stage and the second stage by at least applying the second gain value to an output obtained from the first stage.

11. The method of claim 10, wherein the multi-stage power converter further comprises:
    an outer control loop of the first stage that is responsible for applying the first gain value to the input.

12. The method of claim 10, wherein the multi-stage power converter further comprises:
    an inner control loop of the first stage that regulates a current associated with the input.

13. The method of claim 10, wherein the information associated with a multi-stage power converter includes at least one of: an age of the multi-stage power converter, an amount of energy provided by the multi-stage power converter, a health of the multi-stage power converter, an efficiency associated with the multi-stage power converter, a temperature associated with the multi-stage power converter, an internal operation condition associated with the multi-stage power converter, a number of other multi-stage power converters organized in parallel with the multi-stage power converter, or current associated with the load.

14. The method of claim 10, wherein modifying the first gain value or a second gain value further comprises assigning a first value to the first gain value and a second value to the second gain value.

15. The method of claim 14, wherein the first value and the second value are different.

16. The method of claim 10, the method further comprising modifying a gain value associated with another multi-stage power converter.

17. A system, comprising:
a plurality of multi-stage power converters in a parallel, a first multi-stage power converter of the plurality of multi-stage power converters comprising:
  a first stage including an outer control loop, the outer control loop regulating a load by at least applying a first gain value to an input; and
  a second stage regulating a voltage across a bus between the first stage and the second stage.

18. The system of claim 17, wherein the first stage further comprises an inner control loop that regulates current associated with the input.

19. The system of claim 17, wherein regulating the voltage across the bus further comprises applying a second gain value to an output obtained from the first stage.

20. The system of claim 17, wherein the system further comprises:
one or more processors; and
memory storing executable instructions that, as a result of being executed by the one or more processors, causes the processors to:
  obtain information associated with at least one multi-stage power converter of the plurality of multi-stage power converters; and
  determine the first gain value based at least in on the information.

* * * * *